(12) United States Patent
Yamada et al.

(10) Patent No.: US 6,508,846 B2
(45) Date of Patent: Jan. 21, 2003

(54) PROCESS AND APPARATUS FOR FABRICATING SOLID ELECTROLYTIC CAPACITORS

(75) Inventors: Kazuaki Yamada, Saga (JP); Hidemi Fuchigami, Saga (JP); Nobuhiro Honda, Saga (JP)

(73) Assignees: Sanyo Electric Co., Ltd., Osaka (JP); Saga Sanyo Industries Co., Ltd., Saga (JP)

( * ) Notice: Subject to any disclaimer, the term of this patent is extended or adjusted under 35 U.S.C. 154(b) by 0 days.

(21) Appl. No.: 09/756,905

(22) Filed: Jan. 10, 2001

(65) Prior Publication Data

US 2001/0009054 A1 Jul. 26, 2001

(30) Foreign Application Priority Data

Jan. 17, 2000 (JP) .......................... 2000-007461

(51) Int. Cl.[7] ............................. H01G 9/00; B23P 19/00
(52) U.S. Cl. ........................... 29/25.03; 29/730; 29/742
(58) Field of Search ..................... 29/25.01–25.03, 29/730, 742; 361/523–525

(56) References Cited

U.S. PATENT DOCUMENTS 3,950,842 A * 4/1976 Fournier et al.
4,406,782 A * 9/1983 Hitland ..................... 209/164
5,847,920 A * 12/1998 Li et al.
5,959,832 A * 9/1999 Kobayashi et al. ......... 361/525
6,187,061 B1 * 2/2001 Amatucci et al.
6,246,568 B1 * 6/2001 Nakao et al.

FOREIGN PATENT DOCUMENTS

JP 63-283116 * 11/1988

* cited by examiner

Primary Examiner—Ha Tran Nguyen
(74) Attorney, Agent, or Firm—Armstrong, Westerman & Hattori LLP

(57) ABSTRACT

In a process and an apparatus for fabricating a solid electrolytic capacitor comprising a capacitor element including an anode member provided with a chemical conversion coating and an electrically conductive polymer serving as a cathode electrolyte and impregnating the capacitor element, an agitating station 7 is provided between a mixing station 5 and an impregnating station 6 to have a mixture of a monomer and an oxidizer agitated immediately before the step of impregnating the capacitor element with the mixture to render the mixture uniform. The mixture can be agitated, for example, by an air injection nozzle disposed at the agitating station 7 for injecting compressed air into the mixture. This affords solid electrolytic capacitors with diminished variations in electrical characteristics.

9 Claims, 9 Drawing Sheets

PROCESS AND APPARATUS FOR FABRICATING SOLID ELECTROLYTIC CAPACITORS

FIELD OF THE INVENTION

The present invention relates to a process and an apparatus for fabricating solid electrolytic capacitors.

BACKGROUND OF THE INVENTION

JP-B No. 51489/1987, JP-B No. 51491/1987, JP-B No. 66373/1992, U.S. Pat. No. 4,580,855, etc. disclose solid electrolytic capacitors which comprise a capacitor element including a member of valve-action metal and impregnated with a TCNQ complex salt as an electrolyte, the metal member having a chemical conversion coating. By "TCNQ" is meant 7,7,8,8-tetracyanoquinodimethane.

FIG. 8 shows one type of solid electrolytic capacitor which is already known and has a bottomed tubular aluminum case 9 housing a capacitor element 1, filled with an epoxy resin 91 and having its opening sealed off. As shown in FIG. 9, the capacitor element 1 comprises an anode foil 11 which is an etched aluminum foil provided with a chemical conversion coating, and a cathode foil 12 opposed to and superposed on the anode foil 11 with a separator 13 interposed therebetween. The capacitor element is prepared by rolling up the assembly of the foils and the separator, and impregnating the resulting roll with a solid electrolyte such as a TCNQ complex salt. A pair of lead tab terminals 14, 14 are joined to the anode foil 11 and the cathode foil 12, with lead wires 15, 15 extending from the respective terminals.

The solid electrolytic capacitor described is fabricated by filling a suitable amount of powder of TCNQ salt into a case 9 first, heating the case at 250 to 350° C. to melt the salt into a liquid, immersing the roll into the molten salt to impregnate the roll with the salt, thereafter rapidly cooling the roll as placed in the case to solidify the salt and finally filling an epoxy resin 91 into the case 9.

Further attention has been directed to solid electrolytic capacitors which are compact, have a great capacity and are small in equivalent series resistance (ESR) and in which an electrically conductive polymer, such as polypyrrole, polythiophene, polyfuran or polyaniline, is used as an electrolyte. Like the structure shown in FIG. 9, the solid electrolytic capacitor of this type is prepared by rolling up an anode foil 11 provided with a chemical conversion coating and a cathode foil 12 opposed thereto, with a separator 13 interposed between the foils, to obtain a rolled-up element, forming an electrically conductive polymer layer in the rolled-up element to obtain a capacitor element 1, fitting a sealing rubber packing 90 to the capacitor element 1 at one end thereof having projecting lead tab terminals 14, 14, and thereafter placing the element 1 into an aluminum case 9 as shown in FIGS. 6, (a), (b) and (c). The case 9 is then constricted at an opening end portion thereof to hold the packing 90 by the end portion in pressing contact with its periphery to seal off the case 9.

With the conventional process for fabricating the solid electrolytic capacitor wherein the electrolyte is an electrically conductive polymer, a chemical conversion coating, electrically conductive polymer layer, graphite layer and silver paint layer are successively formed on the surface of a sintered anode member or an anode foil of a valve-action metal, such as aluminum or tantalum, and a cathode lead wire is joined to the coated anode member or foil with an electrically conductive adhesive or the like. However, this process of fabrication is considerably more cumbersome than the usual process of fabricating electrolytic capacitors which comprises rolling up an anode foil provided with a chemical conversion coating and a cathode foil opposed thereto, with a paper separator interposed between the foils, and impregnating the resulting rolled-up element (hereinafter referred to as "capacitor element") with an electrolyte.

On the other hand, the above-mentioned conductive polymer layer is formed, for example, by electrolytic polymerization or vapor phase polymerization, whereas it is not easy to form the conductive polymer layer in the capacitor element of the rolled-up type by electrolytic polymerization or vapor phase polymerization. Although it appears feasible to form a chemical conversion coating and a conductive polymer layer on an anode foil first and to subsequently roll up the foil along with a cathode foil opposed to the anode foil, difficulty is encountered in rolling up the foils without causing damage to the chemical conversion coating or conductive polymer layer.

The conductive polymer layer can be formed alternatively by chemical polymerization in a liquid phase, whereas this process is conventionally low in work efficiency since it is necessary to repeat five to ten times the procedure of dipping the capacitor element in a chemical polymerization mixture, prepared by diluting with an organic solvent the monomer to be made into the conductive monomer by oxidation polymerization and adding an oxidizer to the solution, and drying the dipped element.

Accordingly, the present applicants developed a process for fabricating a solid electrolytic capacitor comprising a capacitor element including an anode member provided with a chemical conversion coating and an electrically conductive polymer serving as a cathode electrolyte and impregnating the capacitor element, the process having the steps of dissolving an oxidizer in a monomer to be made into the conductive polymer by oxidation polymerization to obtain a mixture and dipping the capacitor element in the mixture (JP-B No. 50558/1998). This process eliminated the need for the repetitions of dipping the capacitor element in the chemical polymerization mixture and the subsequent heat treatment, making it possible to obtain compact solid electrolytic capacitors of large capacity and low ESR by a simple procedure.

FIG. 7 shows the layout of production equipment for practicing the process proposed by the applicants for fabricating the solid electrolytic capacitor. With this equipment, a mixing station 5 and an impregnating station 6 are interconnected by a container conveyor 4, and an element conveyor 3 is disposed along the container conveyor 4. Containers 2 each having a plurality of solution cavities 20 are fed to the mixing station 5, and the monomer to be made into the conductive polymer by oxidation polymerization and an oxidizer (dopant) are placed into the cavities 20 of each container 2 to mix the two solutions together and to thereby initiate the oxidation polymerization of the monomer. The container 2 containing the mixture is thereafter transported toward the impregnating station 6 by the container conveyor 4.

On the other hand, a group 10 of capacitor elements connected to one another is transported by the element conveyor 3 toward the impregnating station 6, at which the capacitor elements are dipped in the mixture in the respective cavities 20 of the container 2.

Consequently, the capacitor elements are impregnated with the mixture of monomer and oxidizer, respectively. The capacitor elements are thereafter allowed to stand in air having a temperature of about 30° C. to about 50° C. and a humidity of at least 60% for about 30 minutes for the progress of polymerization reaction and further heat-treated in an oven having a temperature of about 160° C. for about 5 minutes for drying, whereby a polymer layer is formed over the chemical conversion coating on the anode member.

However, the solid electrolytic capacitors fabricated by the conventional process shown in FIG. 7 have the problem that the electrical characteristics, such as ESR, vary from capacitor to capacitor, failing to provide the desired performance as the case may be.

SUMMARY OF THE INVENTION

Accordingly, the present applicants have conducted intensive research to overcome the above problem and consequently found that the mixture of monomer and oxidizer placed in the cavities of the container are not in the form of a uniform mixture at the impregnating station, and that the unevenness of the mixture exerts an influence on the properties of the conductive polymer to be formed over the chemical conversion coating of the anode member to govern the electrical characteristics of the solid electrolytic capacitor as finished, whereby the present invention has been accomplished.

According to the process and apparatus of the invention for fabricating solid electrolytic capacitors, an agitating station is interposed between the mixing station and the impregnating station for agitating the mixture of monomer and oxidizer to render the mixture uniform immediately before the step of impregnating capacitor elements with the mixture.

As a result, a conductive polymer layer of satisfactory properties is always formed on the chemical conversion coating of the anode member in each capacitor element, giving stabilized electrical characteristics to the solid electrolytic capacitor as finished.

The mixture can be agitated by injecting compressed air thereinto with an air injection nozzle provided at the agitating station. Alternatively usable is an ultrasonic generator disposed at the agitating station for applying vibrations to the mixture. Further alternatively, the mixture can be stirred directly with a stirrer disposed at the agitating station.

Thus, the process and apparatus of the invention for fabricating solid electrolytic capacitors provide compact solid electrolytic capacitors of large capacity and low ESR with diminished variations in electrical characteristics.

DETAILED DESCRIPTION OF EMBODIMENTS

The mode of practicing the present invention will be described below in detail with reference to the drawings.

Figure 1:
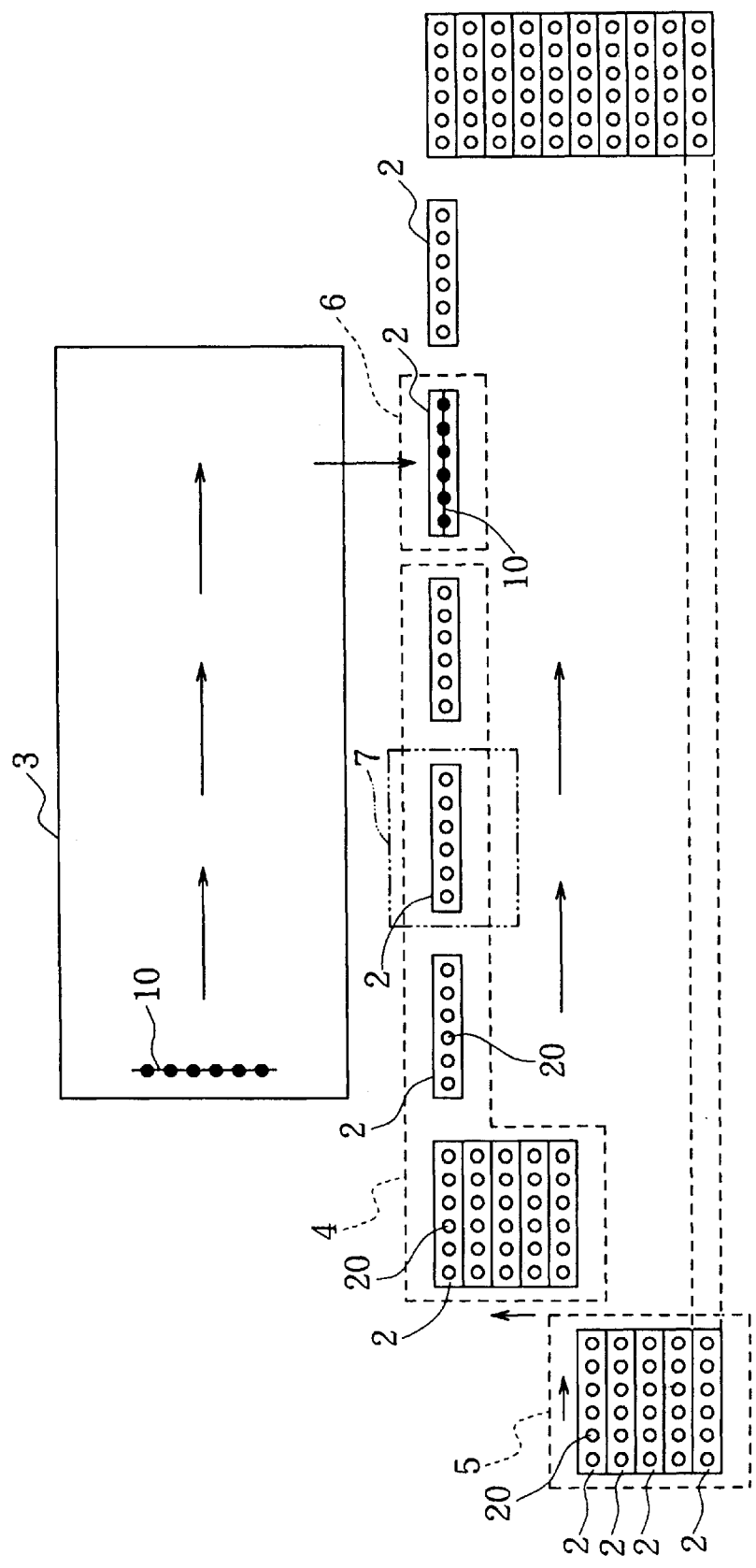
FIG. 1 is a diagram showing the layout of an apparatus of the invention for fabricating solid electrolytic capacitors.

With reference to FIG. 1, the invention provides an apparatus for fabricating solid electrolytic capacitors which includes a mixing station 5 and an impregnating station 6 interconnected by a container conveyor 4. An agitating station 7 is disposed at an intermediate portion of the container conveyor 4. An element conveyor 3 is provided along the container conveyor 4.

Containers 2 each having a plurality of solution cavities 20 are fed to the mixing station 5, and the monomer to be made into an electrically conductive polymer by oxidation polymerization and an oxidizer (dopant) are placed into the cavities 20 of each container 2 to mix the two solutions together and to thereby initiate the oxidation polymerization of the monomer. The container 2 containing the mixture is thereafter transported toward the agitating station 7 by the container conveyor 4. p-Toluenesulfonic acid containing 50% of n-butyl alcohol is usable as the oxidizer, and 3,4-ethylenedioxythiophene, as the monomer.

Figure 2:
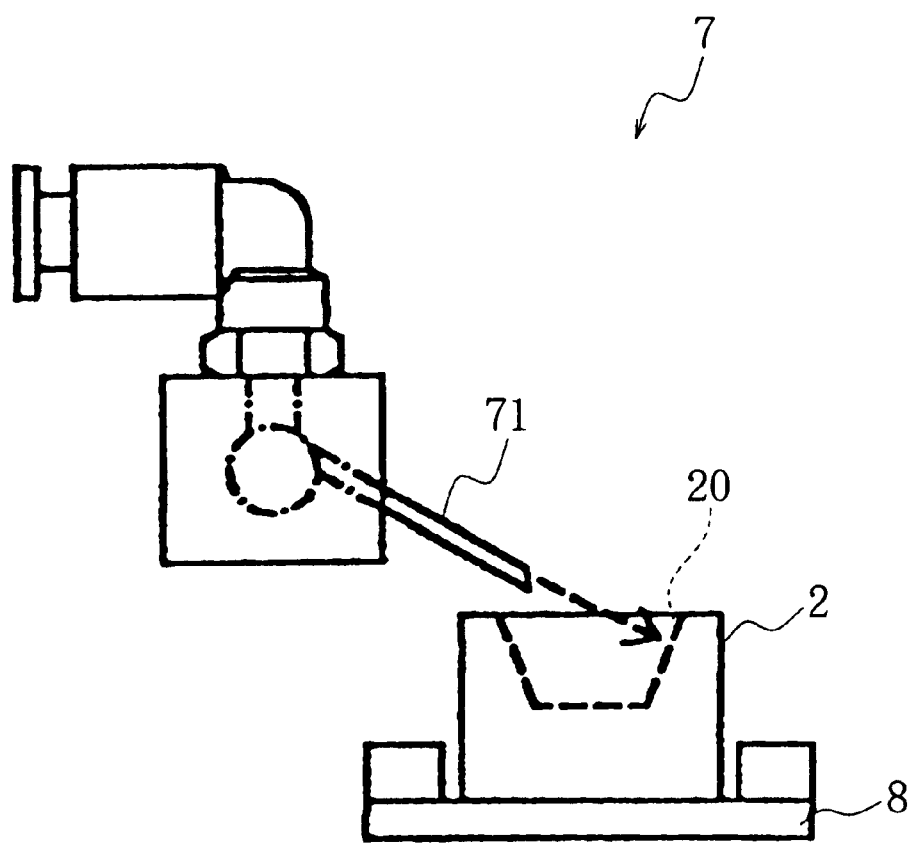
FIG. 2 is a side elevation showing an air injection nozzle disposed in an agitating station.

As shown in FIG. 2, the agitating station 7 is provided with an air injection nozzle 71 for forcing out compressed air toward the solution cavities 20 of the container 2 on a conveyor table 8, whereby the compressed air is injected into the mixture of monomer and oxidizer placed in the cavities 20 of the container 2, and the two liquids are fully agitated into a uniform mixture. The container 2 is thereafter transported toward the impregnating station 6 by the container conveyor 4.

Figure 3:
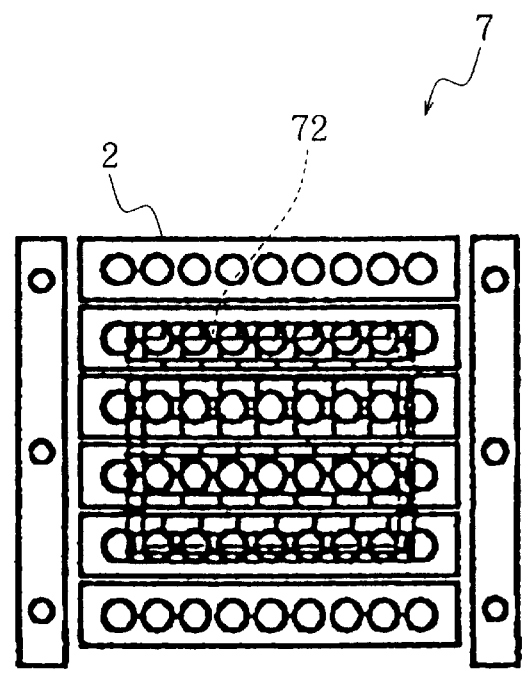
FIG. 3(a) is a plan view of an ultrasonic generator for use at the agitating station.
FIG. 3(b) is a side elevation of the generator.
Figure 3:
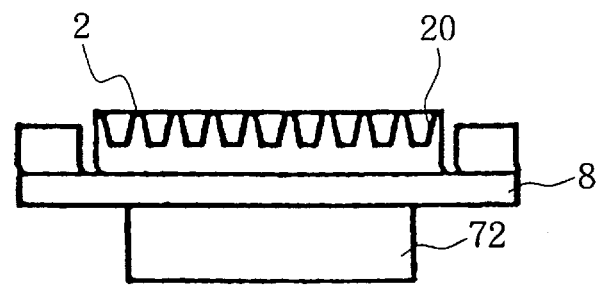
Figure 4:
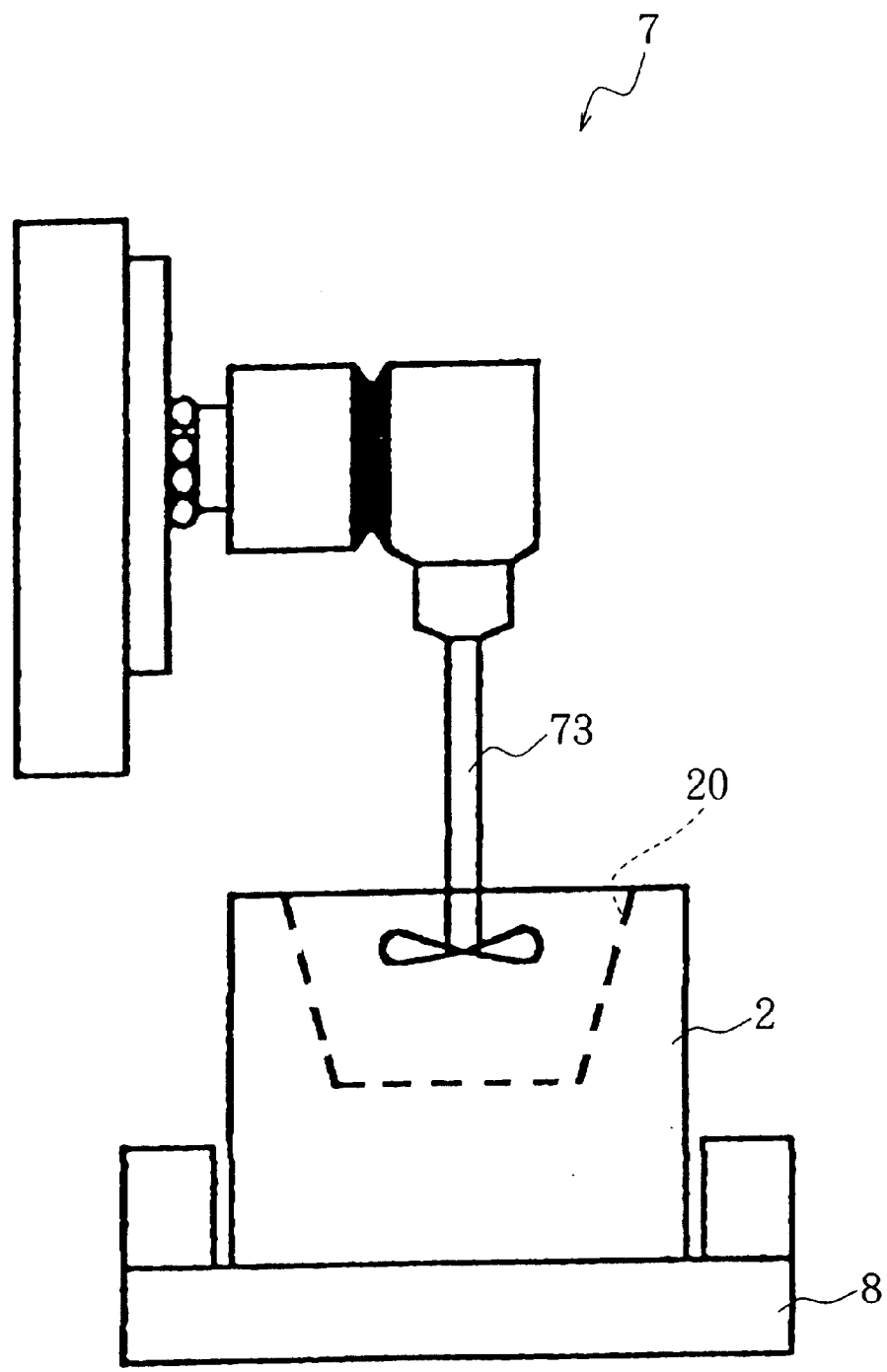
FIG. 4 is a side elevation of a stirrer for use at the agitating station.

The mixture in the cavities 20 of the container 2 can be agitated by applying vibrations thereto with an ultrasonic generator 72 connected to the conveyor table 8 at the agitating station 7 as shown in FIGS. 3(a) and 3(b). Alternatively, the mixture in the cavities 20 of the container 2 can be stirred directly by a stirrer 73 disposed at the agitating station 7 as seen in FIG. 4.

In the apparatus of the invention for fabricating solid electrolytic capacitors, a group 10 of a plurality of capacitor elements connected to one another is transported by the element conveyor 3 toward the impregnating station 6, at which the capacitor elements are dipped into the mixture in the respective cavities 20 of the container 2 as shown in FIG. 1.

Figure 5:
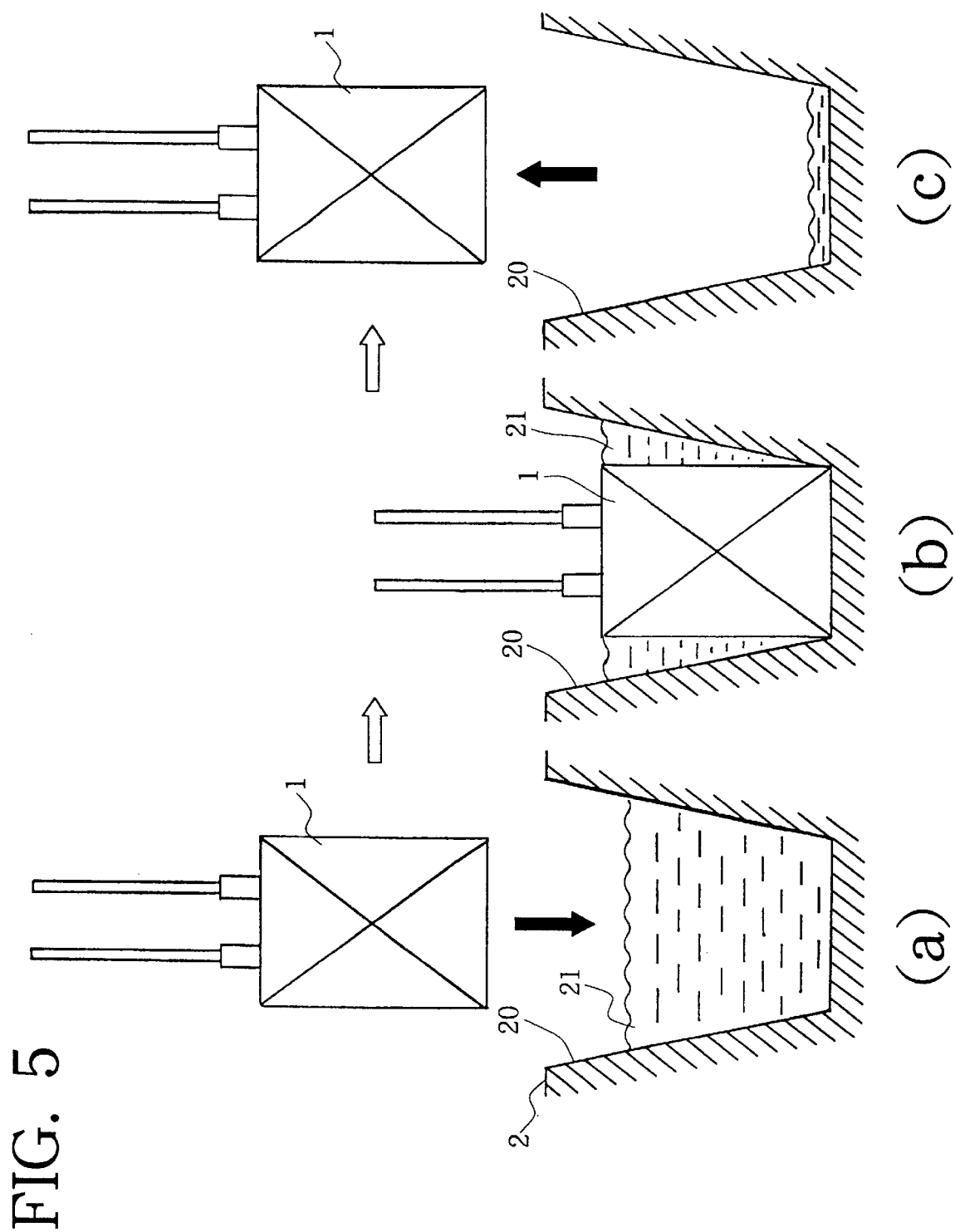
FIG. 5 is a diagram showing the step to be performed at an impregnating station.

FIGS. 5, (a), (b) and (c) show the step of dipping the capacitor element 1 into the mixture 21 as placed in the cavity 20 of the container 2 and thereafter withdrawing the element 1 from the container 2, whereby the capacitor element 1 is impregnated with the mixture 21 within the cavity 20. Subsequently, the dipped capacitor element 1 is placed into an oven and heat-treated at a temperature of at least 200° C. Consequently, an electrically conductive polymer layer is formed over the chemical conversion coating on the anode member within the capacitor element 1.

Figure 6:
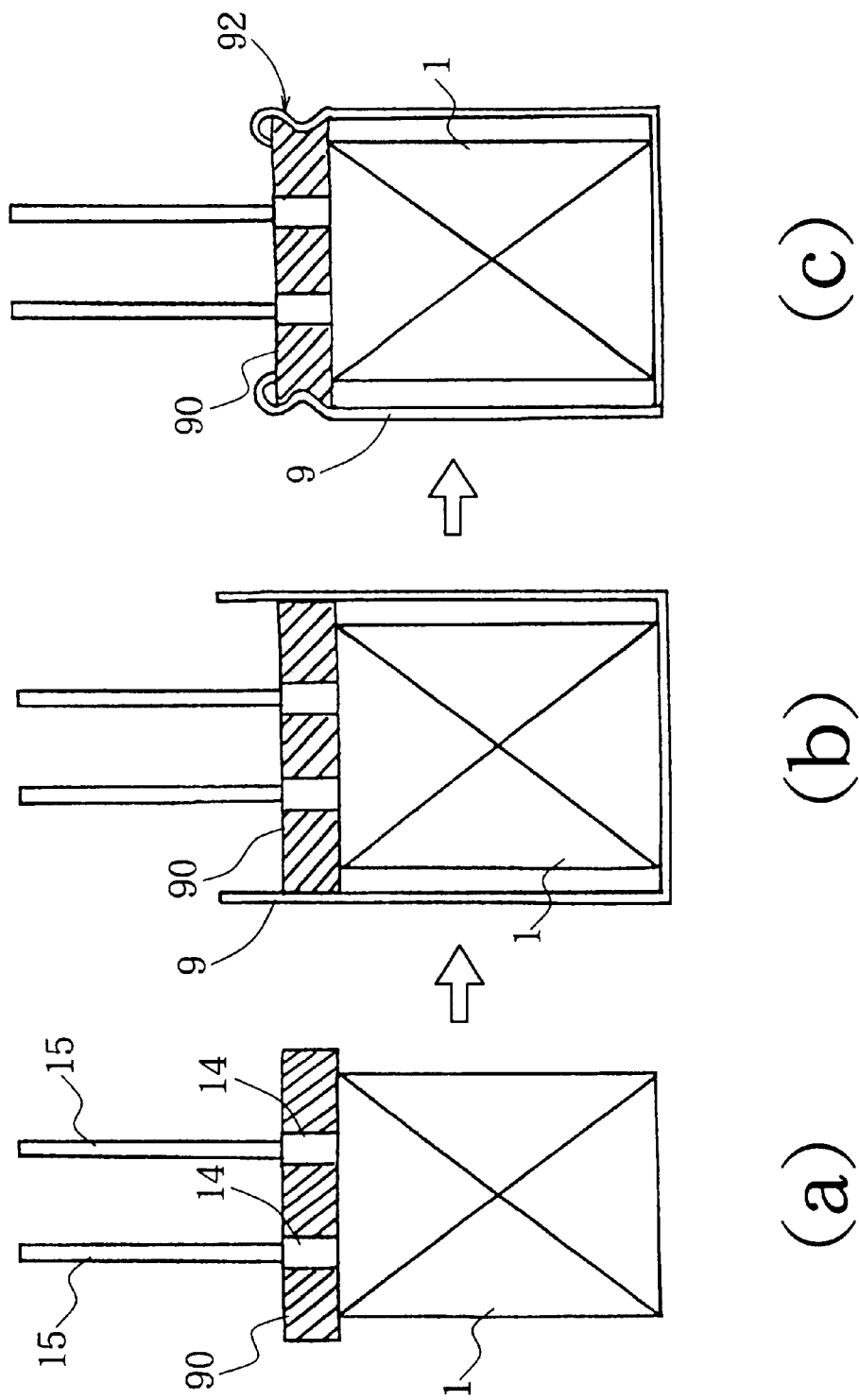
FIG. 6 is a diagram showing the step of placing a capacitor element into a case and sealing off the case.

As shown in FIGS. 6, (a), (b) and (c), a sealing rubber packing 90 is then fitted to the capacitor element 1 at one end thereof having projecting lead tab terminals 14, 14, and the capacitor element 1 is thereafter placed into an aluminum case 9. The case 9 is constricted at an opening end portion thereof to hold the packing 90 by the end portion in pressing contact with its periphery to seal off the case 9. Finally the resulting assembly is subjected to an aging treatment, whereby a solid electrolytic capacitor is completed.

According to the process of the invention for fabricating solid electrolytic capacitors, the agitating station 7 is interposed between the mixing station 5 and the impregnating station 6 to have the mixture of monomer and oxidizer in the container 2 agitated immediately before the step of impregnating capacitor elements 1 with the mixture to render the mixture uniform at the impregnating station 6. As a result, a conductive polymer layer of satisfactory properties is always formed on the chemical conversion coating of the anode member constituting each capacitor element 1, giving stabilized electrical characteristics to the solid electrolytic capacitor.

Figure 7:
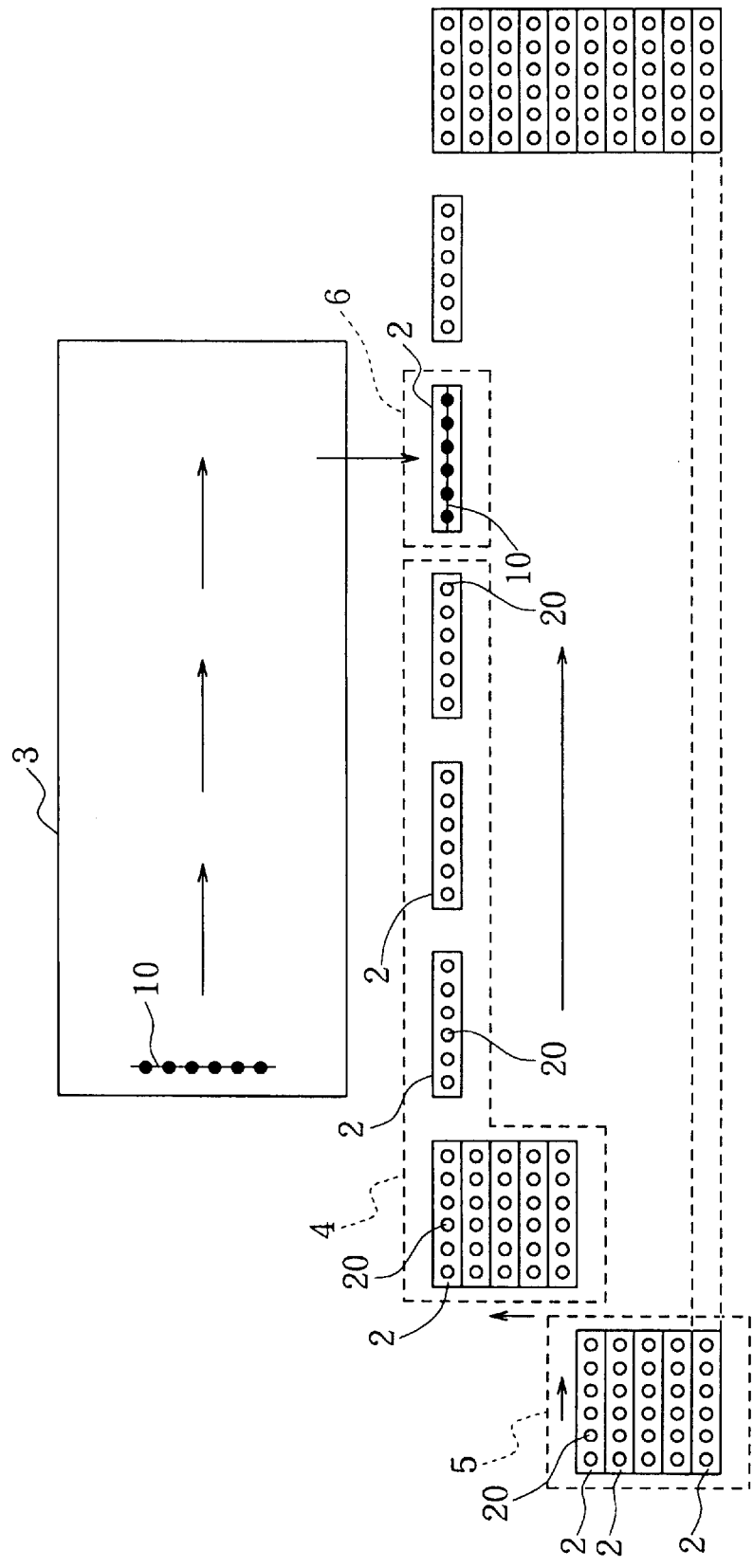
FIG. 7 is a diagram showing the layout of a conventional fabrication apparatus.
Figure 8:
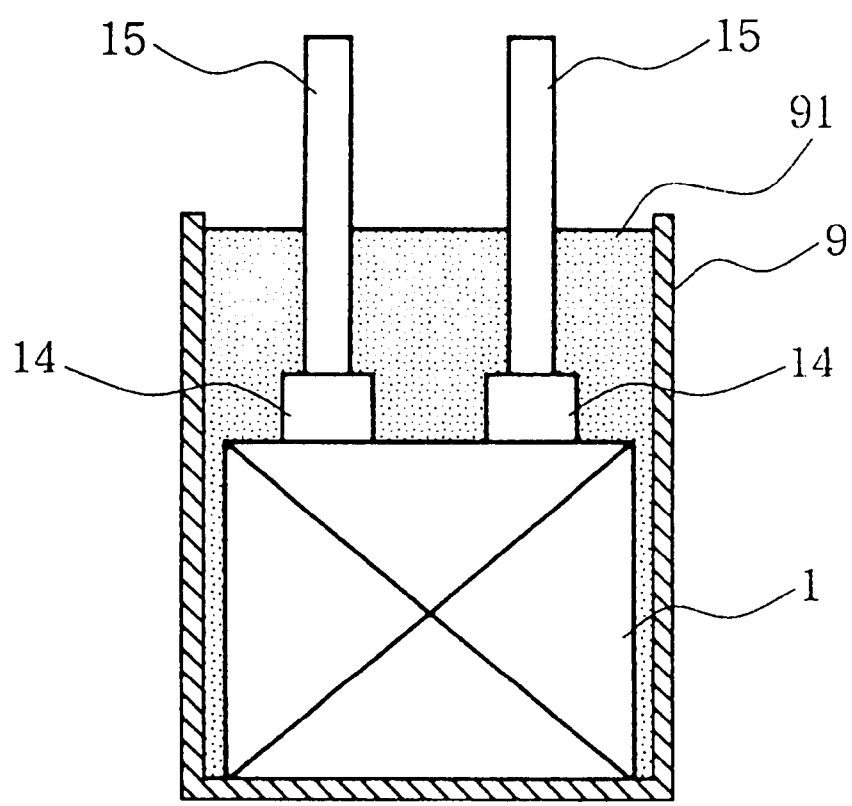
FIG. 8 is a side elevation partly broken away and showing a solid electrolytic capacitor.
Figure 9:
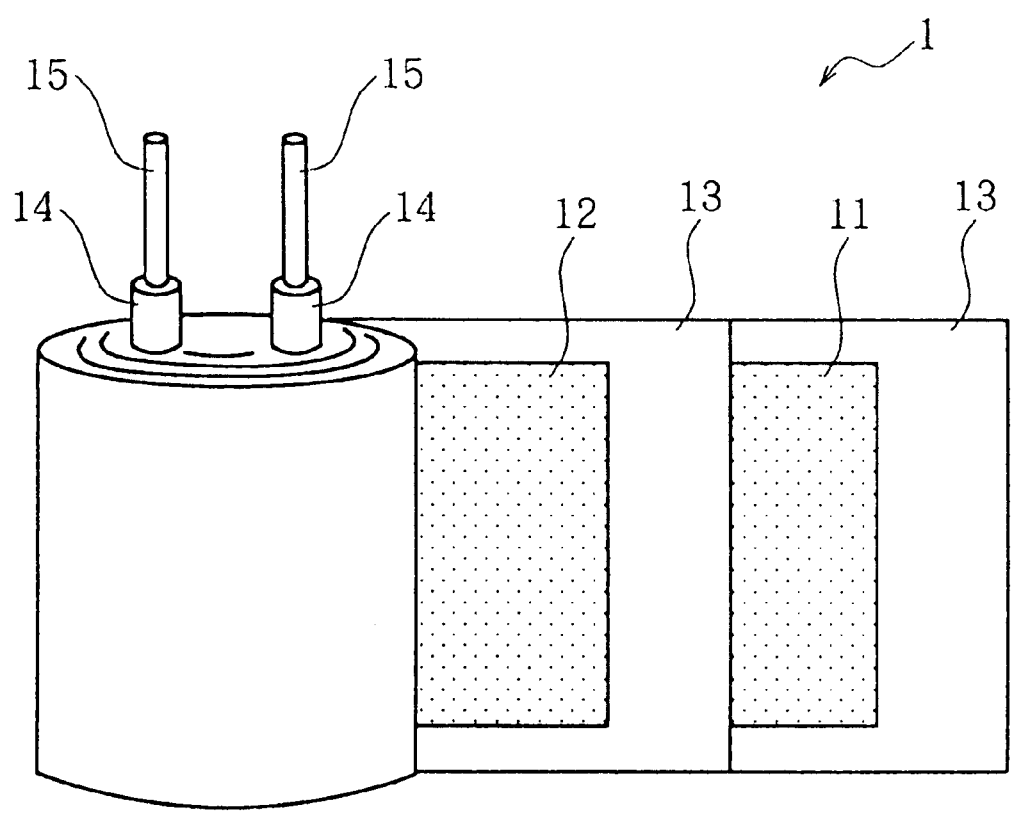
FIG. 9 is a perspective view partly in development and showing a capacitor element.

In order to substantiate the advantage of the present invention, solid electrolytic capacitors prepared by the fabrication process of the invention shown in FIG. 1 (Examples 1, 2, 3) and solid electrolytic capacitors prepared by the conventional fabrication process shown in FIG. 7 (Prior Art) were compared in initial electrical characteristics. Table 1 shows the results.

The capacitors of the prior art and the invention are 6.3 mm in diameter, 5.8 mm in length, 20 V in output voltage and 22 $\mu$F in capacitance. In Table 1, "Cap." stands for the capacitance at 120 Hz, "tan δ" for the tangent of loss angle at 120 Hz, and "ESR" for the equivalent series resistance at 100 kHz. Each of the characteristics values is the average for 30 specimens. The parenthesized value is a standard deviation.

TABLE 1

|  | Cap. [$\mu$F] | tan δ [%] | ESR [mΩ] |
|---|---|---|---|
| Prior Art | 20.8 (0.25) | 1.6 (1.2) | 48.2 (3.4) |
| Example 1 | 22.4 (0.08) | 0.8 (0.4) | 43.3 (1.4) |
| Example 2 | 22.2 (0.10) | 1.0 (0.6) | 45.7 (1.5) |
| Example 3 | 22.5 (0.10) | 1.1 (0.5) | 44.6 (1.4) |

The results of Table 1 show that the solid electrolytic capacitors (Examples 1 to 3) prepared by the process of the invention have electrical characteristics of smaller variations and higher stability than those (Prior Art) prepared by the conventional process.

The solid electrolytic capacitors of Examples 1 to 3 and the prior art were further tested for solder heat resistance for the comparison of heat resistance. Table 2 shows the results.

The solder heat resistance test was conducted by the VPS method (preheating at 150° C. for 120 sec, followed by heating at 240° C. for 50 sec). In Table 2, "ΔC/C" stands for the ratio of the variation in capacitance resulting from the test to the capacitance before the test, and "LC" for the leakage current value as measured 60 seconds after the start of application of the rated voltage (20 V). Each value is the average for 30 specimens.

TABLE 2

|  | Before test | | | | After test | | | |
|---|---|---|---|---|---|---|---|---|
|  | Cap. [$\mu$F] | tan δ [%] | ESR [mΩ] | LC [$\mu$A] | ΔC/C [%] | tan δ [%] | ESR [mΩ] | LC [$\mu$A] |
| Prior Art | 21.0 | 1.5 | 49.2 | 11.5 | −4.1 | 1.9 | 59.8 | 89.9 |
| Exam. 1 | 22.4 | 1.0 | 44.0 | 10.2 | −1.3 | 1.1 | 46.6 | 60.3 |

TABLE 2-continued

|  | Before test | | | | After test | | | |
|---|---|---|---|---|---|---|---|---|
|  | Cap. [$\mu$F] | tan δ [%] | ESR [mΩ] | LC [$\mu$A] | ΔC/C [%] | tan δ [%] | ESR [mΩ] | LC [$\mu$A] |
| Exam. 2 | 22.3 | 1.0 | 46.1 | 12.7 | −1.7 | 1.2 | 50.7 | 63.8 |
| Exam. 3 | 22.2 | 1.1 | 45.5 | 10.9 | −1.5 | 1.1 | 50.5 | 77.2 |

The results of Table 2 reveal that the solid electrolytic capacitors (Examples 1 to 3) prepared by the process of the invention are less impaired thermally in electrical characteristics than those (Prior Art) prepared by the conventional process.

The agitating station 7 provided in the capacitor fabrication apparatus of the invention between the mixing station 5 and the impregnating station 6 makes it possible to produce solid electrolytic capacitors which are stabilized in electrical characteristics and less susceptible to thermal deterioration with respect to heat-resistance characteristics.

The present invention is not limited to the foregoing embodiments but can be modified variously in process steps or apparatus construction by one skilled in the art without departing from the spirit of the invention as set forth in the appended claims. Although the foregoing embodiments have been described, for example, with reference to solid electrolytic capacitors comprising a rolled-up capacitor element, the present invention is applicable also to solid electrolytic capacitors of the resin-molded type wherein a sintered member of tantalum or the like is used, whereby the same advantage as above can be obtained.

What is claimed is:

1. A process for fabricating a solid electrolytic capacitor comprising a rolled-up capacitor element including an anode member provided with a chemical conversion coating and an electrically conductive polymer serving as a cathode electrolyte and impregnating the capacitor element, the process being characterized in that the process has first step of dissolving p-toluenesulfonic acid as an oxidizer in a thiophene monomer to be made into the conductive polymer by oxidation polymerization to obtain a mixture, a second step of agitating the mixture and a third step of dipping the rolled-up capacitor element in the resulting mixture immediately after the mixture was agitated according to the second step.

2. A process for fabricating a solid electrolytic capacitor according to claim 1 wherein the second step is performed by injecting compressed air into the mixture.

3. A process for fabricating a solid electrolytic capacitor according to claim 1 wherein the second step is performed by applying vibrations to the mixture.

4. A process for fabricating a solid electrolytic capacitor according to claim 1 wherein the second step is performed by stirring the mixture.

5. An apparatus for fabricating a solid electrolytic capacitor comprising a rolled-up capacitor element including an anode member provided with a chemical conversion coating and an electrically conductive polymer serving as a cathode electrolyte and impregnating the capacitor element, the apparatus being characterized in that the apparatus has a mixing station for dissolving an oxidizer in a monomer to be made into the conductive polymer by oxidation polymerization to prepare a mixture, an agitating station for agitating the mixture and an impregnating station for dipping the rolled-up capacitor element in the resulting mixture immediately after the mixture was agitated by the agitating station and a container conveyor for transporting a container having solution cavities for containing the mixture from the mixing station via the agitating station toward the impregnating station seriatim.

6. An apparatus for fabricating a solid electrolytic capacitor according to claim 5 wherein an air injection nozzle for injecting compressed air into the mixture is provided at the agitating station.

7. An apparatus for fabricating a solid electrolytic capacitor according to claim 5 wherein an ultrasonic generator for applying vibrations to the mixture is provided at the agitating station.

8. An apparatus for fabricating a solid electrolytic capacitor according to claim 5 wherein a stirrer for stirring the mixture is provided at the agitating station.

9. A process for fabricating a solid electrolytic capacitor comprising a rolled-up capacitor element including an anode member provided with a chemical conversion coating and an electrically conductive polymer serving as a cathode electrolyte and impregnating the capacitor element, the process being characterized in that the process has a first step of dissolving p-toluenesulfonic acid as an oxidizer in the thiophene monomer to be made into the conductive polymer by oxidation polymerization to obtain a mixture at a mixing station, a second step of transporting a container having solution cavities for containing the mixture from the mixing station toward an agitating station, a third step of agitating the mixture in the container at the agitating station toward an impregnating station and a fifth step of dipping the rolled-up capacitor element of rolled-up type into the resulting mixture in the container at the impregnating station immediately after the mixture is agitated according to the third step.

* * * * *